March 5, 1963 R. E. KNOX ET AL 3,079,641
PROCESS OF MOLDING A POLYURETHANE FOAM BY
SHAPING IT WITHOUT COMPRESSION
Filed Feb. 27, 1959

INVENTORS
ROGER E. KNOX
JAMES A. MARGEDANT, JR.

BY *Robert C. Kline*
ATTORNEY 3,079,641
PROCESS FOR MOLDING A POLYURETHANE FOAM BY SHAPING IT WITHOUT COMPRESSION
Roger E. Knox and James A. Margedant, Jr., Brandywine Hundred, Del., assignors to E. I. du Pont de Nemours and Company, Wilmington, Del., a corporation of Delaware
Filed Feb. 27, 1959, Ser. No. 796,111
4 Claims. (Cl. 18—48)

This invention relates to a process of molding polyurethane cellular materials and more particularly to a process of molding polyurethane cellular materials into contoured forms at the time the cellular material is in a plastic state but before final curing of said material has taken place.

Heretofore molded cellular materials have been prepared from either thermoplastic or thermosetting resins. In the case of thermoplastic resins, the cellular material may be shaped and molded by heating above the softening point. This procedure could not be followed with thermosetting resins since heating them to their softening points will cause decomposition of the cellular structure. Thus, in the case of polyurethane resins it is generally the procedure to prepare a mold of desired shape and allow the foamable polyurethane composition to form a cellular structure within said mold. In the formation of any polyurethane cellular material the usual procedure is to react a polyhydroxy compound with a polyisocyanate compound so as to form a polyurethane while simultaneously or subsequently generating a gas which expands said polyurethane into a cellular honeycombed mass. None of the prior art procedures for forming molded polyurethane cellular materials are concerned with a procedure whereby a cellular polyurethane material, particularly a rigid highly crosslinked material, is shaped while it is in a plastic semi-finished condition.

It is an object of the present invention to provide a novel process for preparing molded polyurethane cellular materials. It is a further object of this invention to provide a process for molding polyurethane cellular materials wherein a cellular material is molded after it has expanded to approximately its maximum volume but while it is in a moldable plastic state. Other objects will appear hereinafter.

These and other objects of this invention are accomplished by a process of forming molded polyurethane cellular materials comprising reacting a polyhydroxy compound with a polyisocyanate and forming a gaseous expanding agent therein, casting the foamable mass onto a surface, allowing said mass to expand and when the surface of said mass becomes tack-free, shaping said foamed mass into a contoured form and maintaining said foamed mass in said contoured form until said mass has become cured and retains the shaped form. In general the process of the present invention may be defined as shaping a polyurethane cellular material while said cellular material is in a moldable plastic state and curing the cellular material so that it retains the desired shape.

Any of a wide variety of polyurethane cellular materials may be used in the process of this invention. This includes the rigid, semi-rigid and resilient polyurethanes. In general, these polyurethane cellular materials are prepared by the reaction of a relatively high molecular weight polyhydroxy compound with a molar excess of a polyisocyanate followed by reaction with water or another polyhydroxy compound in the presence of a gaseous expanding agent. The selection of the polyhydroxy compound and/or the polyisocyanate will determine the type of polyurethane obtained. The reaction of the polyhydroxy compound with the polyisocyanate produces the polyurethane and the cellular material is obtained from this polyurethane by generating a gaseous expanding agent therein. This gaseous expanding agent may be carbon dioxide, which would be obtained by the addition of water, which would react with the polyisocyanate compound to form carbon dioxide simultaneously with the formation of urea cross-links. Another method available for forming a gaseous expanding agent is to use a liquid which is inert to isocyanates and which will vaporize at the temperature of the foaming reaction and thus cause expansion to the cellular material. Representative liquids which may be used include pentane, and similar hydrocarbons, trichlorofluoromethane (B.P. 23.8° C.) and other polyhalogenated hydrocarbon compounds such as trichlorotrifluoroethane (B.P. 47° C.), dichlorohexafluoropropane (B.P. 33–35.8° C.), monochloroheptafluorocyclobutane (B.P. 25° C.), dichlorodifluoroethylene (B.P. 20° C.) and 2,3-dichloro-1,1,3,3-tetrafluoropropane-1 (B.P. 47° C.). Trichloromonofluoromethane is preferred.

Any of a wide variety of polyhydroxy compounds may be employed for the preparation of the polyurethane cellular material. These polyhydroxy compounds should have molecular weights of from about 400 to about 8,000 with a molecular weight of from about 400 to 3,000 being preferred. The lower molecular weight polyhydroxy compounds will, in general, yield rigid foams, particularly if they are highly branched materials. The higher molecular weight polyhydroxy compounds yield the more resilient type of cellular materials. Representative polyhydroxy compounds include polyalkyleneether glycols, polyalkyleneether-thioether glycols, polyalkylene-arylene-ether glycols, polyaliphatic hydrocarbon diols, polyester polyols, polyethers derived from oxyalkylation of glycerine, and fatty acid triglycerides having a hydroxyl number of at least about 49. These triglycerides may be either a naturally occurring oil, such as castor oil, or may be a blown drying oil of the type known in the trade as "heavy bodied" oils, such as blown linseed, tung, poppyseed, hempseed, soya oils and the like. In addition, compounds such as tetrols which are obtained by reacting ethylenediamine with ethylene and/or propylene oxide may be used. It is to be understood that two or more different polyols may be used to react with the organic polyisocyanate.

The useful polyalkyleneether glycols may be represented by the formula $HO(RO)_nH$ where R is an alkylene radical containing up to 10 carbon atoms and $n$ is an integer sufficiently large that the molecular weight of the polyalkyleneether glycol is about 400 to 8,000. Not all of the alkylene radicals need be the same. When resilient foams are prepared the preferred polyalkyleneether glycols have molecular weight ranging from about 1,000 to 4,000; when rigid foams are made, the preferred glycols have molecular weights ranging from about 400 to 1,000. Representative examples of these glycols are poly-1,2-propyleneether glycol, 1,2-polydimethylethyleneether glycol, ethylene oxide-modified poly-1,2-propyleneether glycol, polytetramethyleneether glycol, polypentamethyleneether glycol, and polytetramethyleneformal glycol. These polyalkyleneether glycols are made by the polymerization of cyclic ethers such as alkylene oxides or dioxolane or by condensation of glycols.

The polyalkyleneether-thioether glycols may be represented by the formula $HO(GY)_nH$, wherein G represents hydrocarbon radicals at least some of which are alkylene, Y represents chalcogen atoms some of which are sulfur and the rest oxygen, and $n$ is an integer sufficiently large so that the glycol has a molecular weight of about 400 to 8,000.

The polyalkylene-aryleneether glycols are similar to the polyalkyleneether glycols except that some arylene radicals are present. The phenylene, naphthalene and anthracene radicals may be used with or without substituents such as alkyl or alkylene groups. When part of the ether oxygens are replaced with sulfur, a polyalkylene-arylene-ether-thioether glycol results, which also may be used in the present invention.

Polyalkyleneethers having three or more hydroxyl groups may also be used. These compounds may be obtained by condensing ethylene or propylene oxide, or mixtures thereof, with an aliphatic polyol such as trimethylolpropane, glycerol, pentaerythritol, etc.

Still another useful class of compounds are the polyaliphatic hydrocarbon diols. The aliphatic portion of these polymers may be saturated or there may be chain and side-chain ethylenic unsaturation present.

The polyesters containing a plurality of hydroxyl groups which are useful in the present invention are made by the usual methods of condensation polymerization from polyols and dicarboxylic acids. When resilient foams are desired, the polyester glycol is prepared from a diol and a dicarboxylic acid (e.g., 1,4-butanediol and adipic acid); optionally a small amount of a triol (e.g., trimethylolpropane) may be included to provide cross-linking; when rigid foams are desired, the polyester polyol may be prepared from a polyhydric compound (containing at least 3 alcoholic hydroxyl groups) and a dicarboxylic acid; optionally, a small amount of a diol (e.g., ethylene glycol) may be included.

Any of a wide variety of polyisocyanate compounds may be used for the preparation of the polyurethane cellular materials. Representative polyisocyanate compounds include toluene-2,4-diisocyanate, 1,5-naphthalenediisocyanate, cumene - 2,4 - diisocyanate, 4 - methoxy-1,3-phenylenediisocyanate, 4 - chloro - 1,3-phenylenediisocyanate, 4-bromo-1,3-phenylenediisocyanate, 4-ethoxy-1,3-phenylenediisocyanate, 2,4' - diisocyanatodiphenylether, 5,6-dimethyl-1,3-phenylenediisocyanate, 2,4-dimethyl-1,3-phenylenediisocyanate, 4,4' - diisocyanatodiphenylether, benzidinediisocyanate, 4,6 - dimethyl - 1,3-phenylenediisocyanate, 9,10-anthracenediisocyanate, 4,4'-diisocyantodibenzyl, 3,3 - dimethyl - 4,4'-diisocyanatodiphenylmethane, 2,6-dimethyl-4,4'-diisocyanatodiphenyl, 2,4-diisocyanatostilbene, 3,3'-dimethyl-4,4'-diisocyanatodiphenyl, 3,3'-dimethoxy-4,4'-diisocyanatodiphenyl, 1,4 - anthracenediisocyanate, 2,5-fluorenediisocyanate, 1,8-naphthalenediisocyanate, 2,6-diisocyanatobenzfuran, and 2,4,6-toluenetri-isocyanate. In general any organic polyisocyanate may be used. It is to be understood that mixtures of two or more of these polyisocyanates may be employed.

In preparing the polyurethane cellular material from the polyhydroxy compound and the polyisocyanate, it is necessary that a gaseous expanding agent be present. This agent may be a liquid which can be dispersed or preferably dissolved in the reactants and which will vaporize at the temperature of the reaction and thus cause expansion. Typical of such liquids are the halogenated hydrocarbons such as trichlorofluoromethane. If desired, such mixtures can be prepared under pressure or at low temperatures. On the other hand, the expanding agent may be carbon dioxide generated by the action of excess isocyanate with water, or any free carboxyl groups which may be present in the composition.

The procedure for making the polyurethane cellular material may be carried out in any one of several well-recognized ways. In the first instance, a prepolymer may be formed by reacting the polyhydroxy compound with a molar excess of an organic polyisocyanate and then mixing this prepolymer with water and catalyst and pouring the foamable mass onto a surface. British Patent 797,965 discloses a number of procedures for making resilient cellular bodies from a polytetramethyleneether glycol. In another procedure, a part of the polyhydroxy compound may be reacted with a molar excess of the polyisocyanate while another portion of the polyhydroxy compound may be reacted with a molar deficiency of the polyisocyanate. Into the latter may be mixed a catalyst and a vaporizable liquid such as trichlorofluoromethane and then the two prepolymer masses may be mixed and poured onto a surface. In this case the heat of reaction of the isocyanate and polyhydroxy compounds is sufficient to vaporize the volatile liquid. In a third method the high molecular weight polyhydroxy may be reacted with a molar excess of polyisocyanate and then, for the foaming, may be reacted with a mixture of a volatile liquid and a low molecular weight polyhydroxy compound which is present in an amount to react with the remaining free isocyanate groups. A fourth procedure involves the simultaneous introduction of the polyhydroxy compound, the polyisocyanate, and a mixture containing water, a catalyst and a surfactant into a mixer from which the foamable mass is discharged directly onto a surface.

When preparing the cellular materials using water to generate carbon dioxide as the foaming agent, it is generally desirable to employ a catalyst. These catalysts may be selected from a wide variety of tertiary amines, such as N-methyl morpholine, triethylamine, diethylethanol amine, and diethanolamine. It is to be understood that mixtures of two or more different catalysts may be used and that in some instances, it may be desirable to use a buffered catalyst. The use of a buffered catalyst is generally preferred when making a semi-rigid foam. The catalyst may be buffered by partially neutralizing it with a strong mineral acid, such as hydrochloric acid. For purposes of the present invention, the use of N-methyl morpholine, alone or in combination with triethylamine, is preferred for the formation of resilient foams; and the buffered catalyst system which is preferred is a 50% aqueous solution of a 2:1 molar ratio of diethylethanolamine hydrochloride and diethylethanolamine.

In preparing these cellular materials it is frequently desirable to incorporate a surfactant to help control the pore size and uniformity. Amongst the more suitable surfactants are organo silicone polymers such as polydimethylsilanes and block polymers obtained by condensing a polyalkoxy polysilane with the monoether of a polyalkyleneether glycol. These organo silicone polymers should have a molecular weight of about 2500–6000. Other surfactants such as ethylene oxide modified sorbitan, mono palmitate or ethylene oxide modified polypropyleneether glycol may be used to obtain better distribution of components.

The rate of the foaming reaction which may include the reaction between the high molecular weight polyhydroxy compound and the polyisocyanate or the isocyanate-terminated prepolymer and the other reactants (water, other polyhydroxy compounds, etc.) may be controlled by several factors, most important of which are the nature of the polyhydroxy compounds, the particular polyisocyanate used, the presence or absence of catalysts and, if present, the particular catalyst, the temperature, and the foaming agent. The effects of these various factors have been described and are recognized by those skilled in the art. For instance, the rate of reaction of a primary hydroxyl group with a isocyanate is different from that of a secondary hydroxyl group. Isocyanate groups attached to aryl radicals are more reactive than those attached to aliphatic radicals. The presence of substituents, such as nitro groups for instance, on the aromatic ring affects the rate of reaction of the isocyanate group. The shielding effect of bulky groups adjacent to the carbon to which the isocyanate group is attached affects its reaction rate. The temperature at which the reaction takes place also affects the rate of the reaction and the reactivity of the isocyanate group. It is known that basic conditions accelerate the reaction of isocyanate groups with hydroxyl groups while acid conditions tend to slow the reaction. Certain basic amines are known to be active catalysts.

The reaction conditions during foaming may be so balanced that after the reactants are mixed together, the mass begins to foam within about 30 seconds to 2 minutes, and when poured onto a surface and permitted to foam free, will reach its maximum height in about 4-6 minutes. At this stage the mass has reacted sufficiently so that the mass is no longer in a liquid form but the components have polymerized by condensation to a point to where the surface is not tacky. The state of tackiness is well-known in the polymer field. A surface is not tacky when one is able to move his hand or an object freely over the surface when it is stroked. Expressed in another way, a surface is non-tacky when, after another surface is placed against it, the two may be separated at the original interface. On the other hand, a tacky surface causes an object to temporarily hesitate or stick at points and the progress, if any is possible, of stroking is not smooth but is in a series of jerks or alternate rapid moves and stops. Joined tacky surfaces do not separate cleanly at the interface.

When the surface of the polyurethane cellular material reaches the non-tacky stage it is then ready for shaping. The time during which this may be done is normally not very long. In polyurethane systems having active catalysts and many cross-links, the time available may be only one or two minutes. With less active catalysts and systems with fewer cross-links, the period will be several times as long. However, the period is of limited duration, and, in general, will seldom exceed 8-10 minutes.

Any of a wide variety of molded shapes may be formed. A contoured pattern is necessary rather than a mold with sharp projections in order to get good mold definition and to avoid destroying the foam surface and getting undesirable coagulation resulting from disrupted foam cells. One of the most useful forms is that for pipe insulation. Such moldings may be prepared individually or continuously.

Molded objects may be formed individually by pouring the foamable polyurethane mass onto a flat surface which is coated with a mold-release agent or covered with a strip of film, such as a polyethylene film, and permitting the mass to foam until the surface becomes non-tacky. The sheet of foam is immediately stripped from the surface and shaped around or within the form desired, for example, if it is desired to make pipe insulation, a semicylinder of the desired cross-sectional area can be used. The polyurethane cellular material is placed on the mold and a core body having approximately the inner diameter desired is placed on the foam to force it into the cylindrical form. The assemblage thus produced may then be heated in an oven to finish the curing.

If desired, the sheet of cellular material may simply be wrapped around a central shaping core and adhered in place externally and then cured. After curing, the molds are readily removed since the surfaces of the foam are non-tacky, when the foam is placed on them.

The process of this invention may be carried out continuously as illustrated in attached FIGURE 1 wherein a mixer 1 is used to form the polyurethane foamable mass 2 which is deposited onto an endless belt 3, carried on pulleys 4 and 5 at a rate such that when the foamed mass reaches pulley 5 it is in a non-tacky state. From belt 3 the foamed mass is transferred to endless belt 6 carried on rollers 7 and 8, the belt being in the shape of a hollow semi-circle. Immediately after being transferred to this belt the plastic foam is contacted by V-belt 9 with a semi-circular surface carried on rollers 10 which forces the foam down into the semi-circular belt 6. The polyurethane foam thus assumes a semi-circular shape, the outside conforming to the semi-circle of belt 6 and the inside conforming to the semi-circle of belt 9. Belts 6 and 9 move at the same horizontal speed and carry the foam through oven 11 where it is cured. Belt 9 is then stripped out of the foam at point 12 and belt 6 is stripped off as the foam passes over rollers 8.

The formed polyurethane foam then passes off of belt 6 and can be cut into any desired length.

Figure 1:
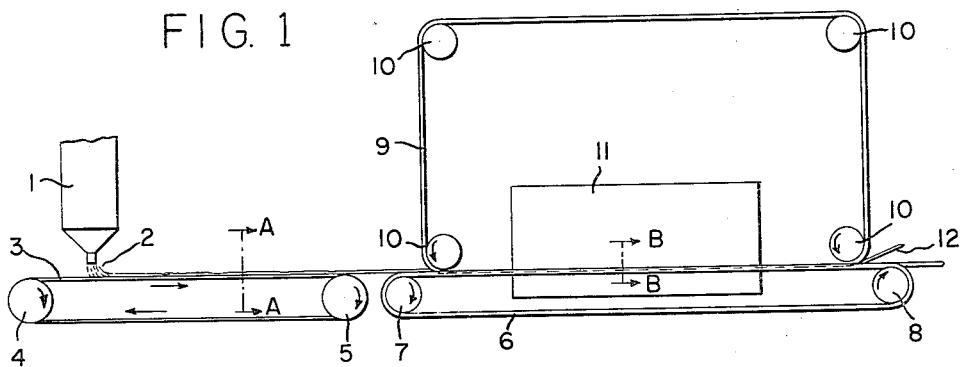
Figure 2:
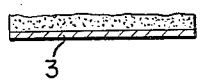
FIGURE 2 shows a cross section A—A of the flat polyurethane foam as it is formed on belt 3.

The length of time that the foam mass is on belt 3 will generally vary from about 2 to 6 minutes and the length of time that the foam mass is on belt 6 and being carried through the oven 11 will vary from a few minutes up to about 30 minutes. Th belt speeds can, of course, be adjusted to set the curing cycle with any particular combination of ingredients. After the polyurethane cellular material has been shaped and permanently assumed the form of the contoured mold, the curing of the material, after it has been stripped from the mold, may be completed over a wide range of temperature and time conditions depending on the reactants used in the formation of polyurethane. Thus curing conditions can range from room temperature up to about temperatures of 200° C. for periods of time from about 15 minutes to 24 hours. The higher temperatures require shorter times.

As mentioned above, the polyurethane cellular material may be shaped into any of a wide variety of desired forms. The process of the present invention is particularly useful in the formation of rigid molded polyurethane cellular materials for use as pipe insulation, preformed insulation panels, preformed structural members, sculptured sound insulation blocks or tile, contoured shapes for void filling, as for example between two plastic contoured sheets for a chair seat, etc. The resilient polyurethane foams may be molded into a variety of forms such as armrests, crash pads, packaging materials for fragile articles, etc.

The following examples will better illustrate the nature of the present invention; however, the invention is not intended to be limited to these examples. Parts are by weight unless otherwise indicated.

EXAMPLE 1

A. *Preparation of Polyurethane Polymer*

100 parts of a polypropyleneether triol, made by propoxylating trimethylol propane with propylene oxide and having a molecular weight of 418 and a hydroxyl number of 404 is mixed with 247 parts of toluene diisocyanate (80% 2,4-toluene diisocyanate and 20% 2,6-toluene diisocyanate) and stirred vigorously for 15 minutes and then allowed to stand for 24 hours.

B. *Preparation of Polyurethane Cellular Article*

To 100 parts of the polyurethane polymer prepared in A above is added 0.5 part of a surfactant which is a water-soluble organo silicone polymer (commercially available as X-520 from Union Carbide Corp.) and 44 parts of N,N,N',N' - tetrakis(2-hydroxypropyl)ethylene diamine and 25 parts of trichlorofluoromethane at room temperature (25° C.) with good agitation. A portion of the mass is poured into a flat mold, lined with polyethylene paper, about 6 inches wide, 1 inch deep and 3 feet long. The mass foams up to about one inch thickness and is tack-free to the touch in about 1 minute. The sheet is stripped from the mold and immediately wrapped around a 5-inch diameter cylindrical mold and taped in place. In approximately 2 minutes the assemblage is placed in a 70° C. oven for 4 minutes to cure. The cylindrical mold is then removed leaving a hollow cylinder of rigid foam approximately 1 inch thick.

EXAMPLE 2

A. Preparation of Polyurethane Polymer 100 parts of polypropyleneether glycol of average molecular weight 2000 and having a hydroxyl number of 56 and containing 0.4% water by weight is heated to 40° C. and then 16.8 parts of toluene diisocyanate (80% 2,4-toluene diisocyanate and 20% 2,6-toluene diisocyanate) is added with good stirring. The temperature rises to about 53° C. The reaction mass is then gradually heated to 120° C. and held there for 75 minutes while stirring. There is then added 24 parts additional toluene diisocyanate and the mass is stirred 30 minutes longer. The free —NCO content of the polyurethane polymer is 9.6%.

B. Preparation of Polyurethane Cellular Article

A first mixture is made of 100 parts of the polyurethane polymer prepared in A above with 10 parts of dodecylphthalate and 0.5 part of polydimethylsiloxane of 50 centistokes viscosity at 40° C. A second mixture is prepared from 1 part of N-methyl morpholine, 0.3 part of triethylamine and 2.2 parts of water. These two mixtures are then mixed in the equipment described in U.S. Patent 2,868,518 at a rate of 2800 parts per minutes of the first mixture and 89 parts per minutes of the second mixture. The mass is poured directly from the mixer into an elongated flat mold about 6 inches wide, 1 inch thick and 3 feet long, lined with a sheet of polyethylene film. A second sheet of polyethylene film is placed on top of the foaming mass. After about 4 minutes at room temperature the mass has foamed to a height of about 1 inch and the surface under the polyethylene sheet is non-tacky. The top polyethylene sheet is stripped off and the cellular mass is immediately placed into a half cylindrical mold of 5 inches inside diameter. There is then positioned in the center of the mass a core mold of 2⅜ inches outside diameter pipe which rested on a form holding the core 1 inch from the cylindrical mold.

The form is then put into an oven at 43–45° C. about 2 minutes after the polyethylene film was stripped from the surface. After 1.5 hours the cellular product has partially cured to a point where it retains the shape of the mold when removed from it and is a resilient, fine-textured cellular material. Final curing is accomplished by heating for 3 hours at 120° C. in an oven after removing from mold.

EXAMPLE 3

The compositions of the premix feeds to the mixer are as follows:

(A) 100 parts of a triol having an average molecular weight of 418 and an hydroxyl number of 404 which has been prepared by condensing propylene oxide with trimethylolpropane is stirred with 247 parts of toluenediisocyanate (80% 2,4-toluenediisocyanate and 20% 2,6-toluenediisocyanate). After the exothermic heat of reaction has been dissipated, 0.5 part of a surfactant which is a water-soluble organo silicone polymer, available from Union Carbide Corp., as X–520, is added and stirred in.

(B) 44 parts of N,N,N',N'-tetrakis(2-hydroxypropyl)ethylene diamine and 25 parts of trichlorofluoromethane are stirred to form a homogeneous solution.

The apparatus is of the general form of that illustrated in FIGURE 1, the mixer 1 being as described in U.S. Patent 2,868,518, the belt 3 being 9 inches wide and the belt 6 being in the form of a semi-circle of 5¾ inches diameter and V-belt 9 having a semi-circular surface of 1¾ inches diameter. All of these belts are polyethylene coated reinforced rubber. The molded product from this equipment is thus suitable as insulation for 1¾ inch pipe. The two belts, 3 and 6, travel at a speed of 4.3 lineal feet per minute. Belt 3 is 9 feet long in flight, the mixer nozzle being positioned about 6 inches from the front end of the belt. Belt 6 is 20 feet long in flight and the curing oven 11 is 15 feet long, the front end being approximately 2 feet from the front end of belt 6. The forward contact of belt 9 is made at a point approximately 6 inches from the forward end of belt 6.

Figure 3:
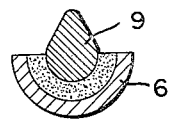
FIGURE 3 is the section B—B showing the molded polyurethane foam between belts 6 and 9.
Figure 4:
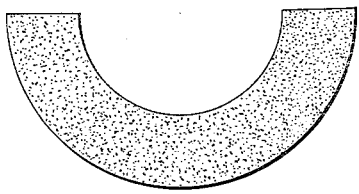
FIGURE 4 shows a segment of a cured, molded cellular material which may be employed as pipe insulation. It is quite apparent to anyone skilled in the art that numerous modifications and variations of a continuous process for the formation of these molded, cured polyurethane cellular materials may be made.

Premix (A) is fed to the mixer 1 at a rate of 563 g. per minute and premix (B) is fed at a rate of 386 g. per minute. The mixer traverses the width of belt 3 in a 7½ inch stroke at a speed of 100 feet per minute thus laying down a line of foamable polyurethane mix in a zigzag pattern on belt 3 as it advances. The lines on successive cycles are thus about ⅔ inch apart. As the mass foams it spreads to form a uniform cellular structure averaging 2 inches in height. When the foam reaches the end of belt 3 it has been on the belt for 2 minutes and is non-tacky but plastic. It is then picked up by belt 6 and starts to conform to the semi-circular shape of the belt from its own weight. Belt 9 then presses the cellular mass into a semicircle as shown in cross section in FIGURE 3. The shaped material then passes into the curing oven 11 which is maintained at 70° C. It requires approximately 4 minutes for passage through the oven. The cellular mass emerges from the oven as a rigid cellular structure from which belts 9 and 6 separate in turn. The strip is then cut to lengths such as that shown in FIGURE 4. The cellular product has a density of 2.2 lbs. per cubic foot.

As many widely different embodiments of this invention may be made without departing from the spirit and scope thereof, it is to be understood that this invention is not limited to the specific embodiments thereof except as defined in the appended claims.

What is claimed is:

1. In the process of forming cellular polyurethane materials by reacting polyhydroxy compounds with polyisocyanates and generating a gaseous expanding agent therein, the steps consisting essentially of casting a foamable polyurethane mass onto a surface, allowing said mass to expand until the surface of said mass becomes tack-free, shaping said foamed mass while in a plastic tack-free state into a contoured form with essentially no change in foam volume and curing said foamed mass in said contoured form without the use of compressive force.

2. A process according to claim 1 wherein the polyhydroxy compound is a polyether polyhydroxy compound and the polyisocyanate is an arylene diisocyanate.

3. A process according to claim 2 wherein the polyether polyhydroxy compound is a polypropyleneether triol, obtained by reacting propylene oxide with trimethylol propane, and the arylene diisocyanate is an isomeric mixture consisting of 80 percent 2,4-toluene diisocyanate and 20 percent 2,6-toluene diisocyanate.

4. A process according to claim 1 wherein the polyhydroxy compound is a polyester polyhydroxy compound and the polyisocyanate is an arylene diisocyanate.

References Cited in the file of this patent

UNITED STATES PATENTS

| | | |
|---|---|---|
| 2,071,647 | Miller | Feb. 23, 1937 |
| 2,575,259 | Cox et al. | Nov. 13, 1951 |
| 2,671,743 | Lindquist | Mar. 9, 1954 |
| 2,949,431 | Britain | Aug. 16, 1960 |
| 3,012,283 | Foster | Dec. 12, 1961 |

OTHER REFERENCES

Satterly, K. P.: Product Engineering, Foamed Isocyanates, February 1955, page 140.